US008654937B2

(12) United States Patent
Agapi et al.

(10) Patent No.: US 8,654,937 B2
(45) Date of Patent: Feb. 18, 2014

(54) SYSTEM AND METHOD FOR CALL CENTER AGENT QUALITY ASSURANCE USING BIOMETRIC DETECTION TECHNOLOGIES

(75) Inventors: Ciprian Agapi, Lake Worth, FL (US); Baiju D. Mandalia, Boca Raton, FL (US); Pradeep P. Mansey, Coral Springs, FL (US)

(73) Assignee: International Business Machines Corporation, Armonk, NY (US)

( * ) Notice: Subject to any disclaimer, the term of this patent is extended or adjusted under 35 U.S.C. 154(b) by 2739 days.

(21) Appl. No.: 11/291,064

(22) Filed: Nov. 30, 2005

(65) Prior Publication Data

US 2007/0121824 A1  May 31, 2007

(51) Int. Cl.
*H04M 1/64* (2006.01)
(52) U.S. Cl.
USPC .............. 379/88.09; 379/265.02; 379/265.04; 379/265.07; 379/266.01; 379/266.02
(58) Field of Classification Search
USPC ................ 379/266.07, 265.02, 265.04; 705/7
See application file for complete search history.

(56) References Cited

U.S. PATENT DOCUMENTS

| | | | |
|---|---|---|---|
| 5,825,869 A | 10/1998 | Brooks et al. | |
| 6,721,416 B1 | 4/2004 | Farrell | |
| 6,937,702 B1 * | 8/2005 | Vacek et al. | 379/88.02 |
| 2002/0169606 A1 | 11/2002 | Bantz et al. | |
| 2003/0004722 A1 | 1/2003 | Butzberger et al. | |
| 2003/0115056 A1 | 6/2003 | Gusler et al. | |
| 2003/0115064 A1 | 6/2003 | Gusler et al. | |
| 2003/0191639 A1 | 10/2003 | Mazza | |
| 2004/0096050 A1 | 5/2004 | Das et al. | |
| 2005/0100158 A1 * | 5/2005 | Kreiner et al. | 379/265.02 |
| 2006/0023865 A1 * | 2/2006 | Nice et al. | 379/265.04 |
| 2006/0072727 A1 * | 4/2006 | Bantz et al. | 379/201.04 |
| 2006/0104433 A1 * | 5/2006 | Simpson et al. | 379/266.07 |
| 2006/0262920 A1 * | 11/2006 | Conway et al. | 379/265.02 |
| 2006/0271418 A1 * | 11/2006 | Hackbarth et al. | 705/7 |
| 2007/0025540 A1 * | 2/2007 | Travis | 379/219 |

OTHER PUBLICATIONS

Kirsch, The Sentic Mouse: Develping a tool for Measuring Emotional Valance, May 1997, MIT.*
Hristova et al., Ad-Me: Wireless Advertising Adapted to the User Location, Device and Emotions, 2004, the 37th Hawaii International Conference on System Sciences.*

* cited by examiner

*Primary Examiner* — Joseph J Nguyen
(74) *Attorney, Agent, or Firm* — Steven Greenberg, Esq.; Carey, Rodriguez, Greenberg & O'Keefe

(57) ABSTRACT

A method, system and computer program for assessing the quality of a call recipient response during an interactive voice dialog. Embodiments of the present invention address deficiencies of the art in respect to biometric analysis and provide a novel and non-obvious method, system and computer program product for call center agent quality assurance using biometric technologies. A solution for automated monitoring of call center agents' skill, mood, professionalism and behavior using biometric technologies and for providing appropriate action to improve customer handling and satisfaction is provided. The solution provides an automated method for detecting potential problems and preemptively taking action to provide consistent, quality customer service.

23 Claims, 2 Drawing Sheets

SYSTEM AND METHOD FOR CALL CENTER AGENT QUALITY ASSURANCE USING BIOMETRIC DETECTION TECHNOLOGIES

BACKGROUND OF THE INVENTION

1. Field of the Invention

The present invention relates to the field of voice applications and biometric analysis and more particularly to a system and method that analyzes call center agent biometric patterns in order to detect and prevent potential problems thus assuring improved customer call handling and satisfaction.

2. Description of the Related Art

Providing quality customer service is increasingly important in today's competitive business environment. Product and service providers need to maintain their existing customers while constantly seeking to acquire new ones. Although the adoption of self-service channels such as Interactive Voice Response (IVR) systems and the Internet is increasing, it by no means replaces human customer service agents.

Although self-service channels provide consistent service to customers, service provided by humans is very subjective and is therefore suitable for providing quick, real-time responses and quickly adapts to specific customer needs. A customer's overall satisfaction with a customer service agent often depends on factors such as the agent's interpersonal skills, mood, and personality. Current methods for providing quality assurance between agents and customers include recording the conversations and playing them back at a later date in order to analyze them offline and take corrective action if necessary. These methods fall short of providing a dynamic quality assurance system since they do not address problems as they arise during the call agent's interaction with the customer.

Another method of enhancing the agent-customer telephone interaction includes determining if the caller has an accent, and if so, redirecting the call to an agent skilled in determining the language of the accent. Still other methods provide real-time dialog assistance to a call center agent by recognizing certain phrases and suggesting a different response phrase. However, these methods do not adequately provide a monitoring system for determining the level of quality in the call agent's dialog with the customer and do not provide a means of taking immediate corrective action using a rule-based system should it be determined that the quality of the call agent's dialog has dropped below a required level.

Biometric data can provide useful information about a person's overall wellness and mood. During a call agent's conversation with a customer, the call agent may become frustrated, annoyed, angry and/or confrontational. At first, these emotions may not be present in the call agent's voice. However, the build up of these emotions might be detected by monitoring certain biometric characteristics. Facial or body expressions might indicate growing frustration on the part of the call agent while conversing with an unruly customer, ultimately leading to argumentative or unprofessional responses to the customer. By monitoring these biometric characteristics as they occur, corrective action can be taken and quality assurance maintained.

BRIEF SUMMARY OF THE INVENTION

Embodiments of the present invention address deficiencies of the art with respect to biometric analysis including voice pattern analysis and provide a novel and non-obvious method, system and computer program product for call center agent quality assurance using biometric technologies. In this regard, a solution for automated monitoring of call center agents' skill, mood, professionalism and behavior using biometric technologies and providing appropriate action to improve customer handling and satisfaction is provided. The solution provides an automated method for detecting potential problems and preemptively taking action to provide consistent, quality customer service.

In one embodiment, a method for assessing the quality of a call recipient response during an interactive call dialog is provided. The method includes the steps of establishing a call between a caller and a call recipient, where the call creates the interactive call dialog, analyzing call recipient behavioral characteristics during the call dialog, comparing the call recipient's behavioral characteristics to a set of pre-defined behavioral rules, and determining if a behavioral pattern exists based upon the comparison of the call recipient's behavioral characteristics to the set of pre-defined behavioral rules.

In another embodiment, a computer program product that includes a computer usable medium having computer usable program code for assessing the quality of a call recipient response during an interactive call dialog is provided. The computer program product includes computer usable program code for establishing a call between a caller and a call recipient, where the call creates the interactive call dialog, program code for analyzing call recipient behavioral characteristics during the call dialog, program code for comparing the call recipient's behavioral characteristics to a set of pre-defined behavioral rules, and program code for determining if a behavioral pattern exists based upon the comparison of the call recipient's behavioral characteristics to the set of pre-defined behavioral rules.

In yet another embodiment, a system for assessing the quality of a call recipient response during an interactive call dialog is provided. The system includes a telephone network for establishing a call between a caller and a call recipient, the call creating the interactive call dialog, and a biometric monitoring device for detecting call recipient behavioral characteristics during the call dialog. The system also includes a database containing pre-defined behavioral rules. Finally, a processor for comparing the call recipient's behavioral characteristics to the pre-defined behavioral rules is provided. The processor determines if a behavioral pattern exists based upon the comparison of the call recipient's behavioral characteristics to the set of pre-defined behavioral rules.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for quality assurance of call agent call dialog. In accordance with an embodiment of the present invention, a rules-based call agent monitoring system is provided that analyzes the biometric characteristics of a call center agent during a live conversation with a customer, and, if desired, take appropriate action. The system integrates existing agent telephony systems and defines business rules and thresholds for events and the corresponding actions that should be taken.

Figure 1:
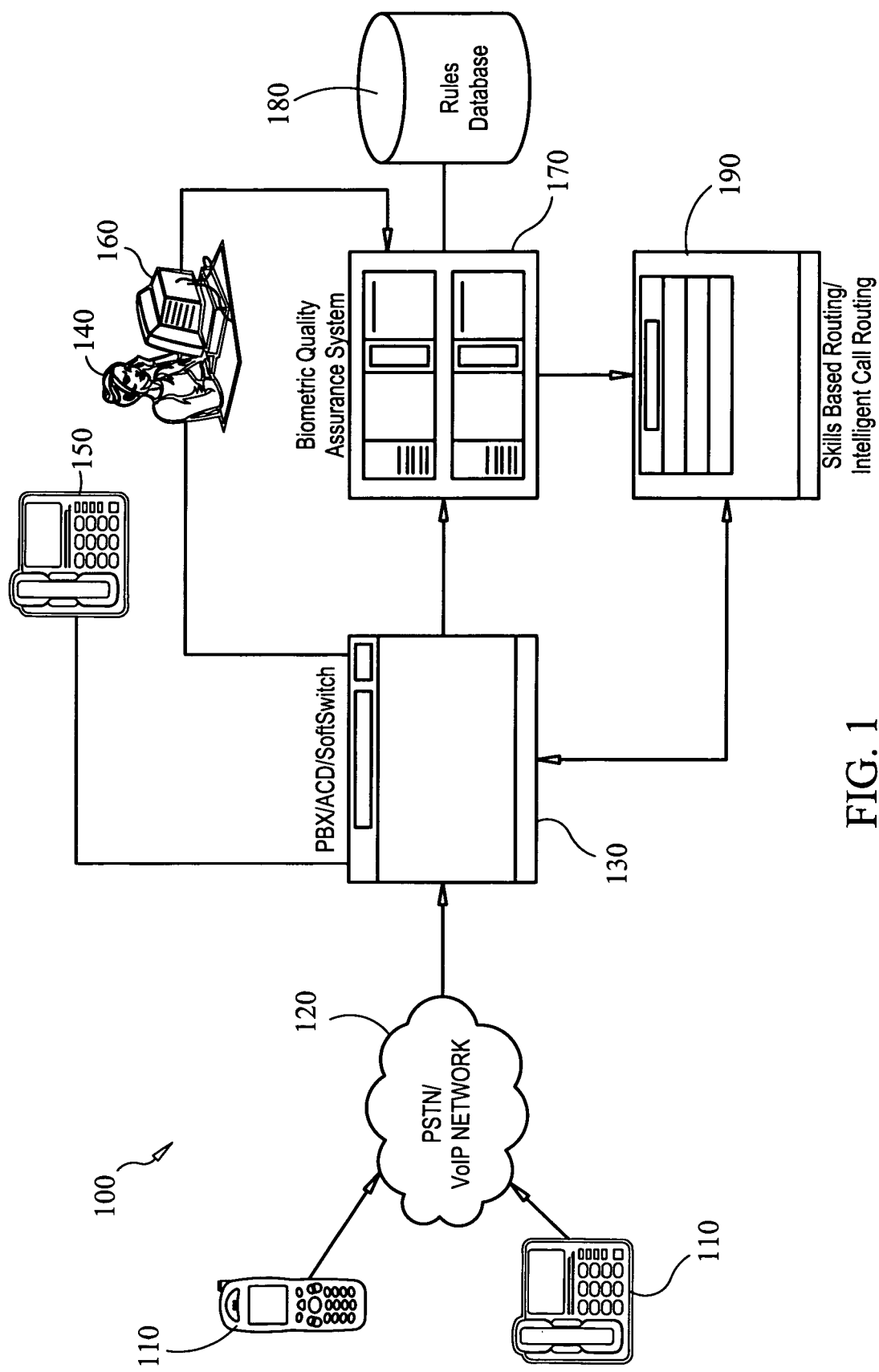
FIG. 1 is a schematic illustration of a call agent quality assurance system incorporating features of the present invention.

In further illustration, FIG. 1 is a schematic diagram of a call agent quality assurance system 100 in accordance with the present invention. System 100 is configured to constantly monitor and analyze a call agent's biometric characteristics during real-time customer conversations on the telephone. System 100 incorporates an existing public telephony network 120 such as a PSTN or VoIP network. A customer that wishes to contact a call center initiates a call via the customer's telephone 110, whether though a landline connection, cellular, PCS, or other type of connection. The call is routed through the public network 120 to a private call switching network 130 such as PBX, ACD or Softswitch.

A call agent 140 receives the incoming call through his or her telephony device 150 and initiates a call dialog with the caller. Call agent 140 can enter and view caller identification information from computer terminal 160. Such information could be, for example, information regarding the location, age, and gender of the user, and/or any other information typically used by call agents to update customer databases.

Once a call has been initiated, a Biometric Quality Assurance System (BQAS) 170 is invoked. BQAS 170 continuously monitors the call agent's biometric characteristics during the telephone dialog with each caller. For example, BQAS 170 analyzes the speech of each call agent 140 and searches for phrases and voice inflections that may indicate the emotion and mood of call agent 140. The analyzed speech is compared with a set of rules in rules database 180 and a processor within BQAS 170 determines if one or more behavioral patterns exist. Based upon the result, further action may be taken such as, for example, re-routing the call to another agent or terminating the call. Skills Based Routing Module (SBRM) 190 is an intelligent call routing subsystem that controls the routing of calls depending upon the skills and/or behavioral pattern of call agent 140 as determined by BQAS.

BQAS 170 may include a biometric sensing devices, a central processing unit, volatile and non-volatile memory, storage devices, network interfaces, processors and associated hardware and software to enable configuration. BQAS 170 is not limited to analyzing speech, but may also include biometric monitoring devices that analyze different types of data in order to monitor and identify call agent behavior. For example, BQAS 170 may include video cameras that take video images of call agent 140 during the interactive call dialog. The captured images may then be compared to defined rules in database 180, and an analysis is performed to determine whether the call agent's facial or body characteristics during the interactive voice dialog with the caller represents a particular behavioral pattern.

Similarly, computer 160 may include a sentic mouse that includes sensors sensitive to the finger pressure of the call agent 140. The sentic mouse, via its internal sensors detects user emotions based upon characteristic signal patterns of the user's finger pressure while operating the mouse. These signal patterns produce data representative of the call agent's behavioral characteristics and may be analyzed in the same fashion as voice and video data, i.e., by comparison to a set of pre-defined rules, events and threshold values in database 180. Although the examples discussed a particular embodiment of the invention, i.e., monitoring of the call agent's speech characteristics, it is within the scope of the invention to include any type of biometric feature that produces data capable of analysis in order to determine identifiable behavioral patterns.

In one embodiment, BQAS 170 analyzes the speech patterns and voice characteristics of call agent 140 utilizing one or more of any speech analysis application common in the art. Advantageously, by comparing the results of the speech analysis to a pre-defined set of business rules, BQAS 170 can quickly determine if the call agent's voice characteristics reveal any pre-defined desirable or undesirable behavioral patterns.

In another embodiment, if one or more identifiable behavioral patterns are identified, BQAS 170 can take one of a number of immediate initiative actions. If the identified behavioral pattern is a negative one, perhaps indicating that call agent 140 is in a bad mood, has unprofessional interpersonal skills etc., or simply lacks the requisite knowledge or skills, certain specific "negative" actions can be taken. As will be described in greater detail below, BQAS 170 may instruct SBRM 190 to re-direct the call to another call agent 140, take call agent 140 off-line, notify the call agent's supervisor, or re-assign call agent 140 to different customer segment groups, i.e. from "premier" customers to "standard" customers, for future calls.

On the other hand, if BQAS 170 determines that the speech of call agent 140 matches a desirable behavioral pattern, "positive" action may be taken. For example, a favorable comment may be placed in the call agent's employee records, or the call agent's supervisor may be informed of the favorable report. Thus, system 100 allows for real-time monitoring and reactionary measures based upon defined business rules and threshold values stored in rules database 180. The rules and threshold values can be virtually anything or any threshold value and the present invention is not limited to a particular rule or threshold value or event. Further, the rules can be defined at another location and by an entity other than the call center and stored in rules database 180, and may be updated or revised. Rules database 180 need not be at the call center and may be stored remotely, provided it is in data communication with BQAS 170. It should be noted that database 180 may be one or more separate databases whereby each database is in communication with the other databases such that information may be shared between them.

In one embodiment, system 100 determines the relative behavioral mood of call agent 140 using speech analysis and then, if necessary, reassigns the tasks for the call agent 140 being monitored. For example, if it is determined that call agent 140 is in a foul mood due perhaps to a personal problem, it is likely that modern speech analysis techniques will detect this in the tone of the agent's voice. In another embodiment, the agent's voice, under normal non-stress conditions can be compared to the call agent's real-time voice during an actual conversation with a customer. The call agent's normal voice may provide an additional benchmark that BQAS 170 can use to determine if one or more behavioral patterns exist.

Figure 2:
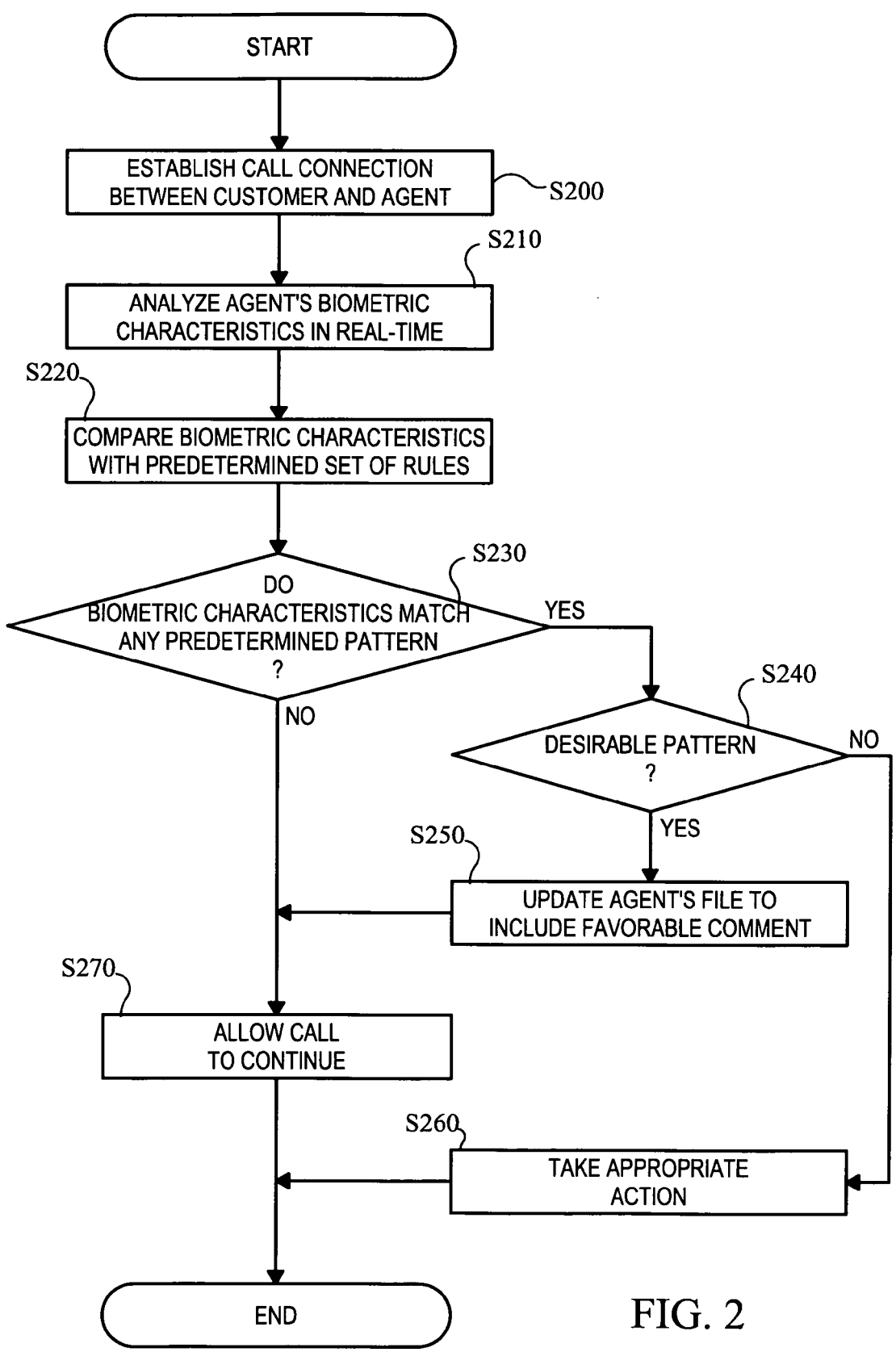
FIG. 2 is a flow chart illustrating a process for performing caller agent quality assurance utilizing features of the present invention.

FIG. 2 illustrates a method performed by an embodiment of the present invention whereby a call agent's voice dialog with a customer is analyzed and corrective action is taken upon comparison of the speech characteristics of call agent 140 with a set of pre-established established rules stored in database 180. The embodiment described herein and depicted in FIG. 2, is of a customer calling a call agent 140 at a call center and is illustrative only. The present invention is not limited in scope to a particular caller-recipient recipient scenario.

A telephone connection is established between a caller and a call recipient, and a call dialog is initiated, at step S200. Speech analysis software is used to analyze the call agent's voice characteristics during the call dialog. The analysis occurs in real-time rather than recording the call agent's voice and analyzing it at a later time. By analyzing the call agent's voice in real-time, system 100 is able to quickly identify certain behavioral patterns and, if necessary, take immediate corrective action in order to provide optimal quality assurance.

At step S210, BQAS 170 analyzes the call agent's voice for content, i.e., the words and phrases actually spoken by call agent 140, and/or voice inflections and intonations. At step S220, the voice characteristics of the call agent's voice is compared to a set of rules, definable events and threshold values stored in rules database 180. Rules database 180 includes the requirements for a variety of behavioral patterns. BQAS 170, in telephonic communication with telephone 150, includes the requisite voice detection/analysis software as well as a processor that performs this comparison and determines if the call agent's voice characteristics, during the current customer dialog, qualify as a specific, pre-defined behavioral pattern, at step S230. The analyzed voice characteristics may identify behavioral patterns that could be defined as "desirable" patterns or "undesirable" patterns.

Examples of desirable behavioral patterns could be but are not limited to, pleasant and polite voice responses, use of courteous words or phrases, and the lack of voice agitation should the customer become difficult to handle. Examples of undesirable behavioral patterns could be the use of abusive language, voice agitation, which may represent a poor or disagreeable mood, and/or lack of providing a proper response to a customer question thus indicating a lack of requisite skill. The examples of desirable and undesirable behavioral patterns listed above are merely illustrative of types of behavioral patterns that might be identified upon comparison of the call agent's voice characteristics with the database rules and the invention is not limited to any specific patterns.

Referring to FIG. 2, once it is determined that a behavioral pattern exists, BQAS 170 determines if the pattern is a desirable one or an undesirable one, at step S240. If the detected pattern is defined as desirable, system 100 may incorporate optional step S250. Step S250 is a step designed to note the existence of the desirable behavioral pattern. This step could take the form of one or more of a variety of steps, including updating the call agent's personnel file to include a positive comment, contacting the call agent's supervisor to inform the supervisor about the call agent's quality dialog, or any other "positive" action relating to the call agent 140 and his or her telephone behavior during the voice dialog with the caller. In any event, the present call dialog is allowed to continue, via step S270.

Conversely, if the identified call agent behavioral pattern is considered to be undesirable, further action may be taken at step S260. This action is considered "negative" and could be in the form of re-routing the call to a different call agent via SBRM 190, interrupting or terminating the present dialog, informing the call agent's supervisor regarding the undesirable behavior, or re-assigning the call agent to a different customer class for all future calls, or for a specified duration until call agent 140 receives "positive" or "desirable" behavior recognition.

In an alternate embodiment, rather than analyzing the call agent's voice, other biometric methods of analysis may be used to determine the emotional status of the call agent. For example, video taken of the call agent 140 showing negative facial expressions can provide indication of negative behavioral patterns. While simple facial expressions or gestures may not initially rise to the level that warrants a responsive action, prolonged expressions of displeasure or violent gestures may exceed a threshold thus warranting responsive action.

A computer mouse augmented with sensors to collect sentic data can be included with computer 160. In this fashion, BQAS 170 is in electrical communication with computer 160 and can detect unusual or excessive finger pressure on the mouse, which might tend to indicate agitation on the part of call agent 140. Thus, system 100 may include one or more data collection methods including but not limited to those listed above in order to obtain real-time data of the behavior of call agent 140 during customer interaction. This data is compared to a set of pre-defined rules in database 180 and BQAS 170 can identify behavioral patterns in the same fashion as described above with respect to voice characteristics.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/A) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for assessing the quality of a call recipient response during an interactive voice dialog, the method comprising:
    establishing a call between a caller and a call recipient, the call creating the interactive call dialog;
    analyzing in a biometric quality assurance system (BQAS) executing in a computer with at least one processor and memory, call recipient behavioral characteristics during the call dialog, wherein the call recipient behavioral characteristics include facial expressions;
    comparing in the BQAS the call recipient's behavioral characteristics to a set of pre-defined behavioral rules; and
    determining by the BQAS if a behavioral pattern exists based upon the comparison of the call recipient's behavioral characteristics to the set of pre-defined behavioral rules.

2. The method of claim 1, wherein the call recipient behavioral characteristics include voice characteristics.

3. The method of claim 1, wherein the call recipient operates a sentic mouse during the interactive call dialog and the call recipient behavioral characteristics further comprise data received from the sentic mouse.

4. The method of claim 1, further comprising determining if the behavioral pattern is a positive behavioral pattern or a negative behavioral pattern.

5. The method of claim 4, further comprising taking an action based upon the behavioral pattern.

6. The method of claim 5, wherein if the behavioral pattern is a negative behavioral pattern, further comprising terminating the interactive call dialog between the caller and the call recipient.

7. The method of claim 5, wherein if the behavioral pattern is a negative behavioral pattern, further comprising re-routing the call to another call recipient.

8. The method of claim 5, wherein if the behavioral pattern is a negative behavioral pattern, further comprising preventing the call recipient from participating in future interactive call dialogs with callers of a defined class.

9. A computer program product comprising a computer usable medium having computer usable program code for assessing the quality of a call recipient response during an interactive call dialog, the computer program product including:
    computer usable program code for establishing a call between a caller and a call recipient, the call creating the interactive call dialog;
    computer usable program code for analyzing call recipient behavioral characteristics during the call dialog, wherein the call recipient behavioral characteristics include facial expressions;
    computer usable program code for comparing the call recipient's behavioral characteristics to a set of pre-defined behavioral rules; and
    computer usable program code for determining if a behavioral pattern exists based upon the comparison of the call recipient's behavioral characteristics to the set of pre-defined behavioral rules.

10. The computer program product of claim 9, wherein the call recipient behavioral characteristics include voice characteristics.

11. The computer program product of claim 9, wherein the call recipient operates a sentic mouse during the interactive call dialog and the behavioral characteristics further comprise data taken from the sentic mouse.

12. The computer program product of claim 9, further comprising computer usable program code for determining if the behavioral pattern is a positive behavioral pattern or a negative behavioral pattern.

13. The computer program product of claim 12, further comprising computer usable program code for taking an action based upon the behavioral pattern.

14. The computer program product of claim 13, wherein if the behavioral pattern is a negative behavioral pattern, further comprising usable program code for terminating the interactive call dialog between the caller and the call recipient.

15. The computer program product of claim 13, wherein if the behavioral pattern is a negative behavioral pattern, further comprising usable program code for re-routing the call to another call recipient.

16. The computer program product of claim 13, wherein if the behavioral pattern is a negative behavioral pattern, further comprising usable program code for preventing the call recipient from participating in future interactive call dialogs with callers of a defined class.

17. A data processing system for assessing the quality of a call recipient response during an interactive call dialog, the data processing system comprising:
    a telephone network for establishing a call between a caller and a call recipient, the call creating the interactive call dialog;
    a biometric monitoring device for detecting call recipient behavioral characteristics during the call dialog, wherein the call recipient behavioral characteristics include facial expressions and wherein the biometric monitoring device is a video camera configured to observe the facial expressions of the call recipient;
    a database containing pre-defined behavioral rules; and
    a processor for comparing the call recipient's behavioral characteristics to the pre-defined behavioral rules;
    the processor determining if a behavioral pattern exists based upon the comparison of the call recipient's behavioral characteristics to the set of pre-defined behavioral rules.

18. The data processing system of claim 17, wherein the biometric monitoring device is a voice analyzer.

19. The data processing system of claim 17, wherein the biometric monitoring device is a sentic mouse and the call recipient behavioral characteristics include finger pressure readings taken from the mouse.

20. The data processing system of claim 17, wherein an action is taken based upon the behavioral pattern.

21. The data processing system of claim 20, wherein the action taken is to terminate the interactive call dialog between the caller and the call recipient.

22. The data processing system of claim 20, wherein the action taken is to re-route the call to another call recipient.

23. The data processing system of claim 20, wherein the action taken is to prevent the call recipient from participating in future interactive call dialogs with callers of a defined class.

* * * * *